United States Patent

Hornsey et al.

[11] Patent Number: 5,250,273
[45] Date of Patent: Oct. 5, 1993

[54] HYDROMETALLURGICAL LEACHING PROCESS AND APPARATUS

[75] Inventors: Derek Hornsey, Beaconsfield; Robert G. H. Lee, Montreal, both of Canada

[73] Assignee: Canadian Liquid Air Ltd - Air Liquide Canada LTEE, Montreal, Canada

[21] Appl. No.: 933,904

[22] Filed: Aug. 27, 1992

Related U.S. Application Data

[63] Continuation of Ser. No. 641,786, Jan. 16, 1991, abandoned.

[30] Foreign Application Priority Data

Jan. 18, 1990 [CA] Canada .................................. 2008063

[51] Int. Cl.⁵ .................. C01G 1/00; C01G 53/00; C01G 43/00; C01G 7/00
[52] U.S. Cl. ........................................ 423/3; 423/20; 423/27; 423/28; 423/109; 423/150.1
[58] Field of Search ................. 423/3, 20, 27, 28, 109, 423/150.1

[56] References Cited

U.S. PATENT DOCUMENTS

| | | | |
|---|---|---|---|
| 4,035,292 | 7/1977 | Himsley | 423/7 |
| 4,192,740 | 3/1980 | Savard et al. | 210/3 |
| 4,246,111 | 1/1981 | Savard et al. | 210/96.1 |
| 4,284,510 | 8/1981 | Savard et al. | 210/614 |
| 4,301,007 | 11/1981 | Savard et al. | 210/96.1 |

Primary Examiner—David Brunsman
Attorney, Agent, or Firm—Oblon, Spivak, McClelland, Maier & Neustadt

[57] ABSTRACT

A process and apparatus for leaching metal values from a particulate mineral ore containing metal values employs a fluidized bed of the particles; a leaching agent solution containing dissolved oxygen flows upwardly of the bed in a lower leaching zone, to an upper clarification zone; a velocity profile is maintained to promote settling of particles so that the particulate solids remain in the leaching zone and a clarified leachant-containing liquid low in suspended solids rises and collects in the clarification zone; the process is carried out with a minimum of undissolved gas and avoids the need for mechanical agitation, but the kinetics of the chemical leaching reaction is improved and heat loss via escaping gases is avoided.

19 Claims, 5 Drawing Sheets

HYDROMETALLURGICAL LEACHING PROCESS AND APPARATUS

This application is a continuation of application Ser. No. 07/641,786, filed on Jun. 16, 1991, now abandoned.

This invention relates to the dissolution of metal values from ores, concentrates and calcines, particularly gold, uranium, copper, zinc, nickel and lead.

Hydrometallurgical processes involve the use of water or aqueous solutions into which metal values are leached from ore minerals, and then precipitated as metals after the solutions are suitably purified.

Gold is commonly found as a native metal associated with several sulphide minerals including pyrrhotite, arsenopyrite, pyrite and galena, in a matrix of gangue, generally quartz. A normal practice to dissolve gold is by cyanidation in the presence of oxygen at room temperature. The leaching equipment selection depends on the grade of the ore and the amenability of a particular process to gold leaching For gold grades greater than 5 g/ton, aerated leaching vessels are used, the most common designs being: air agitated Pachucas where the aeration serves the dual purposes of a source of dissolved oxygen and a source of undissolved stirring gas; and the combined air and mechanical agitators, which consist of tanks with a central tube open at the bottom through which compressed air is admitted, this central tube also serves as a shaft for two agitating arms, one at the top and one at the bottom.

Because sulphide minerals are partially soluble in cyanide solutions, consuming large amounts of oxygen and cyanide from the solution, the leaching rate of gold can be severely limited by lack of oxygen or cyanide; and consequently, a pre-treatment prior to cyanidation is required. The pre-treatment consists of an approximately 24 hours aeration period in which the ground ore, approximately 80% of which is less than 150 mesh, is mechanically agitated at about 50% solids and at a pH of 10. Dissolved oxygen enhances the formation of a stable ferric hydroxide film on iron sulphide surfaces. As a consequence cyanide in the leaching step is mostly consumed for the dissolution of gold. Sometimes, solution replacement is accomplished by dewatering and filtration in order to avoid the negative effect of foreign ions in the cyanidation step.

According to the theory of electrochemical leaching reactions for a given cyanide concentration the leaching rate of gold is controlled by the oxygen diffusion from the bulk to the surface. Many gold plants operate their cyanidation processes at cyanide concentrations which do not limit the gold leaching rate. This means that the rate could be increased by increasing the dissolved oxygen concentration.

The most important uranium ores are pitchblende ($U_3O_8$) and uraninite ($UO_2$) and oxidizing agent for their leaching. As mined, pitchblende has a grade range of 0.01 to 1% $U_3O_8$ but it can be concentrated by gravity methods to 50% $U_3O_8$, which concentrate is ground (80% minus 100 mesh) and sent to the leaching circuit. Pachuca tanks or mechanical agitators using oxygen or other oxidizing agents such $MnO_2$, $NaClO_3$ or $NaNO_3$ are also commonly used.

In order to dissolve uranium ores it is necessary first to oxidize them to $UO_3$ whereafter they can be leached with acid or alkaline solvents at a temperature of 90° C.

In the case of copper oxide ores, for example, cuprite $Cu_2O$, tenorite $CuO$, malachite $CuCO_3$ and $Cu(OH)_2$; and zinc oxide ores, for example, zincite $ZnO$, smithsonite $ZnCO_3$ and zinc calcine, leaching is performed in the presence of an oxidizing agent usually air or oxygen. Oxidation is required to convert ferrous iron to ferric iron so that iron is precipitated as ferric hydroxide by the addition of hydroxide ions. Leaching is carried out in percolation, Pachuca or mechanically agitated tanks, either in batch or continuous operation. Table 1 shows some technical aspects for leaching oxide minerals.

TABLE 1

| Equipment Operating Conditions for Leaching of Oxide Minerals | | | | | |
|---|---|---|---|---|---|
| Metal Oxide | Grade % | Leaching Agent | Equipment | Size Distribution | Temp. °C. |
| $Cu_2O$ | 0.5–10.0 | $H_2SO_4$ (80–90 g/l) | Percolation or Pachuca | 15 mm to size 80%–150 mesh approx. | 25 25 |
| ZnO (as calcine) | 60 | $H_2SO_4$ 100 g/l | Pachuca or agitation tanks | 80%–150 mesh approx. | 50–70 |

A sulphide raw material, which is considered submarginal for smelting can be treated by several hydrometallurgical processes to recover the metal value. In the presence of oxygen, sulphate or elemental sulphur is obtained depending on the temperature and pH. Oxidation converts insoluble Co, Ni and Cu sulphides to soluble sulphates, removing the iron as a precipitated ferric oxide. Autoclaves are used at 70°–80° C. under air pressure of 100 psi for 24 hours.

Typical analysis of an industrial operation is given in Table 2.

TABLE 2

| Pressure Leaching of Sheritt-Gordon Sulphide Ore. | | |
|---|---|---|
| | Concentrate % | Residue % |
| Ni | 10–14 | 0.6–1.4 |
| Co | 0.3–0.4 | 0.1–0.2 |
| Cu | 1–2 | 0.2–0.3 |
| Fe | 33–40 | 42–52 |
| S | 28–34 | 9–15 |

Another example of dissolution of sulphide in the presence of oxygen is leaching of pyrite-containing oxide ores, for example, uranium ores. This reaction results in the formation of ferric ions and sulphuric acid which is utilized in leaching in uranium. The experimental conditions are a temperature of 160° C. using an autoclave at 0.5 to 1 atm. of oxygen pressure; after 6 hours uranium recovery is 90–95%.

Formation of elemental sulphur is produced in the aqueous oxidation of zinc sulphide at 110° C. using dilute sulphuric acid and oxygen.

In order to produce elemental sulphur rather than sulphate, oxidation by free oxygen must be avoided, especially if pyrite is present because it gives practically no free sulphur when oxidized in aqueous solution. Thus a moderated oxidizing potential must be used, in the form of as ferric and cupric ions and nitric acid. Leaching of copper, specifically chalcopyrite $Cu Fe S_2$, zinc, nickel and lead sulphides can be performed with these oxidants.

Many different leaching approaches have been used to treat the ores mentioned before. The approach depends on the ore mineralization, size and grade of the ore body, the liberation size and the cost of reagent at the site. The most frequently used procedures being heap leaching, percolation leaching or some form of agitation leaching. In particular reference is made to agitation leaching in conventional tanks, namely, Dorr agitators, Pachucas and mechanical mixers.

The Dorr agitator consists of a central, hollow, air lift shaft with a rake at the bottom of the shaft. The whole system turns slowly. The rake moves any settled solids across the bottom of the tank to the central air lift, and the air distributes the pulp uniformly in the tank. The main advantages are the low power consumption and low maintenance.

The Pachuca Tank is a large, conical bottomed tank up to about 16 m total height and 10 m diameter. Compressed air is jetted in at the tank bottom, agitating the slurry and keeping the ore particles suspended in the leach liquor. The nozzle size for the jets varies from 20 to 100 mm diameter, with 25 mm being common. The major advantage is the simplicity; the air compressor maintenance which does not contact the acid solutions is simple. The main disadvantage is the heat lost to the atmosphere carried by the undissolved nitrogen and air which rises as wet air bubbles.

The mechanical agitators use different kinds of impellers for particle suspension : the axial flow turbine, the radial flow turbine and the marine type propellor. Agitated tanks are usually baffled to prevent formation of a vortex. At about 50% solids, where hindered settling occurs, power requirements for slurry movement through the tank are reduced. Pulp solids composition in the tank may be different from that in the feed. For a continuous operation, feed and discharge must be identical.

The present invention relates to a process and apparatus for hydrometallurgical leaching of ores, concentrates and calcines, particularly in ground form. The invention seeks:

a) to enhance the kinetics of the process and recovery of metal values;
b) to avoid problems of material handling, during the operation and associated with the removal of exhausted or spent mineral;
c) to avoid or minimize intermediate solid-liquid separation units in multistage countercurrent leaching;
d) to improve the efficiency of oxygen utilization for a leaching process which requires oxygen as an oxidant; and
e) to reduce energy cost.

Broadly described, this invention accomplishes these purposes by contacting a fluidized bed of the finely divided ore material with a leaching agent, typically comprising a solution made up of water and extracting chemicals, the leaching agent containing dissolved oxygen, while maintaining an effective leaching temperature.

In accordance with the invention a substantial relative movement between the leaching solution and the ore particles is obtained by fluidizing the particles using the solution. As a consequence, the diffusion of reactants and products to or from the reaction surface increases and the kinetics of the reaction increase if the rate control step is mass transport of substances. The conventional leaching apparatus produces agitation of the entire solution including fine particles suspended therein.

In accordance with the invention there is provided a process for recovering a metal from an ore containing the metal comprising: providing a vertical column having a lower leaching zone and an upper clarifying zone, establishing an aqueous slurry of finely divided mineral ore particles in said leaching zone, said slurry comprising an aqueous solution of leaching agent and dissolved oxygen defining a fluid medium, and finely divided ore particles in said fluid medium, said particles comprising a gradated range of particles extending from dense, metal rich, unleached particles through less dense, partially leached metal containing particles to porous, metal poor, leached particles, maintaining a velocity profile in said column spanning said leaching and clarifying zones effective to maintain said unleached and partially leached particles fluidly suspended in said leaching zone and promote settling of said porous particles from an upper region of said leaching zone such that said clarifying zone comprises an aqueous leachate having not more than 200 mg/l of said particles, and withdrawing a metal pregnant leachate from said clarifying zone.

In another aspect the invention provides an apparatus for carrying out the process.

In this way the recovery of metal values due to the existence of particle elutriation in the fluidized bed is increased. In a multistage counter-current leaching, longer residence time for coarse particles within the column is achieved using an outlet at a certain height of the column in order to control a selective withdrawal of slurry with fine particles. The size distribution in the outlet can also be controlled by varying the ascending flow of liquid stream to obtain a new equilibrium of elutriation. In both cases the longer the residence time for coarse particles, the greater the prospect for dissolution of metal values. On the other hand, from the viewpoint of reagent concentration or solution strength, leaching is more effective for coarse particles, when inlet solution enters at the bottom of the column. Therefore recovery of metal values is increased by these two effects.

This invention particularly involves leaching minerals such as gold and uranium in the presence of oxygens the injection of pure oxygen gas increases the dissolved oxygen (D.O.) content in the solution entering the tank. Due to the geometry of the system and the oxygen diffuser device as explained herein below, the efficiency of the oxygen dissolution is much better than with conventional equipment. In Pachuca tanks large amounts of air have to be used in order to suspend solids in the leach liquor, and maximum concentration is proportional to the oxygen partial pressure. In agitation tanks the efficiency of oxygen dissolution is mainly due to the oxygen diffuser design. In the present invention, the static pressure of the column produces a D.O. concentration gradient favoring the kinetics of dissolution at the bottom. On the other hand, due to the simplicity of the system, the top of the column can be sealed hermetically in order to increase the oxygen partial pressure and therefore the D.O.

The invention also seeks to provide a process and apparatus for the leaching of ores which is adaptable to either single stage or multiple stage operation.

Still further the invention seeks to provide a process and apparatus of the above character which also makes use of the leaching liquid injection to fluidize the slurry.

In one embodiment of the invention there is provided a multistage countercurrent leaching to transfer slurry directly from one column to another through outlets and inlets at a certain height of the columns. The slope of a transference pipe necessary to flow the slurry between the columns is a function of slurry characteristics and static pressure difference between columns. This gravity transportation avoids the use of slurry pump, storage tank and possible solid liquid separations. If the solution in a column needs to be removed, a set of valves can be opened and closed, injecting pure water at the bottom of the column; at the end, the mineral is clean to be mixed with a desired solution. It can occur at the end of preaeration step of gold cyanidation process. Because in multistage countercurrent leaching the exhausted mineral is removed continuously, the present apparatus does not need a special device for this operation. An auxiliary bottom outlet for slurry can be installed in one of the columns, for cleaning the circuit.

In a particular embodiment of a process and apparatus of the above character, the overflow from the top of each column or tower is essentially clear, by which is intended an average value of less than 200 mg/l, preferably less than 100 mg/l of suspended solid. In order to eliminate intermediate solid-liquid separation, the column presents a cross-sectional area greater at the top than the bottom. The flow rate per unit area at the bottom is high enough to keep the solids in suspension; at the top of the tower or column flow is sufficiently low that solids settle out and a clear overflow is obtained. This condition is achieved by control of the flow at the bottom and top of the column, and this is more especially achieved by the geometry of the column.

In a further embodiment of a single stage or multistage operation the amount of clarified solution in the recycling stream is controlled as overflow for the next column. A valve installed in the recycle line provides the optimum flow according to the residence time in the column and the specific characteristics of leachate and mineral.

In still a further embodiment of the process and apparatus for leaching, an oxygen diffuser device improves the efficiency of oxygen utilization increasing the kinetic efficiency and recovery of metal values in gold and uranium ore. Such a device is described in U.S. Pat. No. 4,246,111 (1981) to Canadian Liquid Air Ltd./Air Liquide Canada Ltée.

By means of the hydrometallurgical process and apparatus of the present invention it is possible to minimize capital costs for the leaching equipment and operating costs, and to avoid solid-liquid separation as an intermediate step in the columns.

The invention also provides an improved hydrometallurgical process and apparatus which eliminates the need for direct mechanical agitation such as by means of rake arms or impellers.

By means of this invention it is possible to save energy for a leaching process at high temperature using a liquid phase as a fluidizing medium, and to avoid the use of air as in Pachucas, in which most of the air leaves the process and carries large quantities of heat with it. Hence there is an economy to be gained by eliminating air; the heat lost to atmosphere is saved plus also the energy required to generate compressed air.

In an embodiment of the process and apparatus of the above character, use is made of steam injection or a heating device outside the reactor to achieve an effective leaching temperature. In both cases the heating power is controlled thermostatically by conventional means.

In another embodiment of the invention there is provided a flexible process and apparatus in which the feed material can be fresh ore, concentrate or calcine or can be the product of other metallurgical operations. For example, gold ores containing uranium or copper sulphide are first processed for gold extraction by flotation, then the tail is leached for the two metals in succession. Due to the flexibility of this apparatus in multistage countercurrent leaching, the first columns are used to dissolve one metal and the slurry containing the exhausted ore for this metal is leached in the next columns for the remaining metal. Pregnant solutions for each one can be sent to purification/precipitation steps by switching certain valves in the circuit.

In accordance with the invention the dissolved metal values can be recovered in the recirculation line between the top and bottom of the column. In the specific case of gold a carbon-in-leach process can be performed in the recirculation line by simply installing a recovery bed screen with activated carbon within it in the line. Such a procedure has the advantage that the concentration of leached metal values in the column is maintained low by removal of the leached metal values from the clarified liquid exiting the column before the clarified liquid is reintroduced at the bottom of the column. This shifts the equilibrium in the column in favour of leaching.

It is also possible, in accordance with this invention, to provide an apparatus in which high pressure leaching can be performed in a batch operation. Because liquid injection is used in this apparatus instead of air, the system becomes isolated from the environment simply covering hermetically the clarification zone at the top of the column. This alternative can be applied for leaching of Au, U and sulphide ores which require high oxygen pressure to increase the reaction kinetics.

In accordance with preferred embodiments of the invention a two zone tower is used for the leaching process in place of conventional tanks. The tower consists of a tapered cylindrical vessel, with a small diameter a the bottom and larger diameter at the top.

An externally located pump draws clarified liquid flow from the top of the tower, pumps it through an oxygen dissolving device and returns it as a recycled stream to the bottom.

The flow of liquid upwardly in the tower maintains the solids in suspension, as well as transferring oxygen to the solids for the oxidation extraction.

At the bottom of the tower the flow rate per unit of cross-sectional area is maintained high enough to keep the solids in suspension. At the top of the tower the flow rate is lows so that solids settle out and a clear overflow for recycling through to the pump is obtained.

The ore slurry is added about one third of the tower height from the top and spent ore slurry is removed about one third of the tower height from the bottom.

Leaching agent is added at the botfom of the tower by way of the recycled stream from the top, through the suction of the pump, and is removed at the top.

In the prior art Pachucas, solids build-up occurs on the wall of the vessel, especially in the conical shaped lower portion. This problem can be overcome in the two-zone tower by installing a slow revolving rake that just touches the walls of the tower, suitably the rake may revolve at 1-5 revs./hour.

The process may be carried out batchwise as follows. First the tower is primed by adding to it a charge comprising a slurry of finely divided ore to be leached, or, if several towers are employed, in series, they are all primed in this way.

A leaching agent, for example, in the form of a solution of leaching chemical, is passed into a lower part of the tower, and upwardly through the charge of finely divided ore at a velocity effective to maintain a fluidized bed, leachate is drawn off from an upper zone in the tower and passed through an oxygen dissolving device and recycled into the lower zone of the tower. Pregnant leachate containing the metal values is also drawn off continually until the ore is spent.

The process is preferably carried out with a series of interconnected towers. In this procedure, a fresh leaching chemical is passed into a lower zone of an end tower. Leachate containing residual leaching agent is drawn off, oxygen dissolved in it, and the oxygenated leachate passed back to the lower part of the tower. At the same time, leachate containing residual leaching agent is passed from the end tower to the recycle stream of an intermediate tower, where oxygen is dissolved in it and the resulting stream passed into the bottom zone of the intermediate tower and leachate containing residual leaching agent drawn off from the top of the intermediate tower and passed to the recycle stream of further tower where oxygen is dissolved in it and the oxygen-containing solution passed into a bottom zone of the further tower. In this procedure, when the ore in the end tower is spent, the ore in the intermediate tower becomes spent, the ore in the further tower semi-spent, and the end tower is filled with fresh ore and so on.

The leaching may also be performed in a continuous process in a series of leaching towers, each of which is preferably a vertically elongated vessel having a sidewall defining a vertical treating chamber whose cross-sectional area is greater at the top than at the bottom.

In this arrangement there is an initial tower which has a bottom inlet for fresh ore slurry and an overflow outlet for a final solution of leachate.

A final tower has a bottom outlet for exhausted ore slurry and a first overflow outlet for a solution of leachate and residual leaching agent to be passed to the preceding tower.

The intermediate towers each have a bottom inlet for recycled solution containing leachate residual leaching agent and dissolved oxygen. The intermediate towers also have a first overflow outlet for leachate and residual leaching agent to be passed to the preceding tower.

Each tower has a recycle system including a line leading from a second overflow outlet for its own leachate, joined by a line for supplementing it, in the case of the end tower, with fresh leaching agent, and in the case of the other towers for supplementing it with overflow solution from the succeeding tower. If it is necessary, the supplemented solution in the recycle system of each tower is passed through an oxygen-dissolving device and the resulting oxygencontaining solution is passed into the bottom inlet of that tower.

An ore slurry outlet, at an intermediate level, in the initial tower is connected to an ore slurry inlet at a lower level in the adjacent intermediate tower, and an ore slurry inlet in the end tower is connected to an ore slurry outlet at a higher level in the adjacent intermediate tower.

A process, according to the invention, employing a series of towers, as described, proceeds as follows, using leaching uranium ore as an example.

First the towers are primed with a charge of slurry.

Untreated uranium ore is then fed continuously to the slurry inlet of the initial tower and leached slurry solution is continuously removed from the slurry outlet of the final tower.

Fresh leaching agent, for example, sulfuric acid, is introduced into the system in the end tower along with overflow solution from the tower made up of leaching agent containing a leachate of dissolved uranium and discharged from the overflow at the top of the end tower.

Clarified overflow is recycled in each tower, through the oxygen dissolving device and injected into the bottom of the tower. In the case of the end tower, the recycle overflow solution is supplemented by fresh leaching agent. In the case of the other towers, the recycle solution is supplemented by overflow solution from the succeeding tower.

In this way the solution of leaching agent, containing dissolved oxygen is passed countercurrent to the ore in the successive towers starting with the end tower.

In the case of either the batch or continuous process, the flow rate of liquid in the bottom of each tower is adjusted to fluidize the charge, that is, to maintain the solids in suspension. The upward velocity of the flow is adjusted to balance the tendency of the solid particles to settle under gravity.

Steam is injected into each tower or a heating device controlled by conventional means, preheats the solution to maintain a desired leaching temperature. In the case of uranium, this is suitably in the range of 50° C. to 100° C.; in the case of gold leaching by cyanidation is generally performed at room temperature. The concentration of the leaching agent, for example, sulfuric acid in the case of uranium, is adjusted in conjunction with the temperature, to maintain an efficient leaching solution. The residence time of the ore in the towers is maintained by adjusting the flow rate of the untreated ore to keep pace with the removal rate of the treated ore, whereby the overflow is a substantially clear liquor substantially free of separated solids.

The overflow from the top of each tower is essentially clear having a suspended solids content preferably not more than about 100 mg/l. This condition is achieved by control of the flow rate at the top of the column in the clarifying zone. Maintaining a low concentration of solids makes recycling possible with minimum damage to the pump. Slurry is very hard on pumps because of the abrasive nature of the ore particles and the process becomes unworkable if the content of suspended solids in the overflow rises beyond predetermined limits.

The oxidant is pure oxygen, more especially at least 95% oxygen according to standard measurements instead of air. This has the advantage of increasing the amount of dissolved oxidant contained in the solution, eliminates the cost of providing compressed air and eliminates the heat lost in the ballast nitrogen. An increased leaching rate is achieved by the increase of the oxidant in the solution and the countercurrent contact between the solids and the leaching agents in the leaching solution.

It is also important that the oxygen be thoroughly dissolved, for example, by the use of an oxygen-dissolving device as disclosed in U.S. Pat. No. 4,246,111 (1981) to Canadian Liquid Air Ltd./Air Liquide Canada Ltée., assignee of Guy Savard et al. This Patent describes means for the efficient dissolution of oxygen in an aqueous medium.

Thus undissolved oxygen and undissolved gases such as nitrogen are avoided. Undissolved gases would rise through the column conveying or entraining solids and thus disturbing the desired clarification settling in the upper part of the tower. Additionally undissolved gases extract heat from the system.

The temperature of the fluidized column is controlled, for example, by the injection of steam into the bottom of the leaching towers or by preheating the solution using a heating device. The temperature may thus be adjusted to the requirements of the particular ore under the conditions of the invention. The fluidization ensures a homogeneous system maximizing contact between dissolved oxygen, leaching agent and ore particles, while avoiding agitation of the ore particles so that the ore particles may settle under gravity.

As the ore particles are contacted with the leaching solution, they become porous as a result of extraction of metal values, and thus become less dense. By minimizing agitation of the system, while promoting contact of the particles with the leaching solution and dissolved oxygen by fluidization, disturbing influences on the clarification by settling are minimized.

BRIEF DESCRIPTION OF THE DRAWINGS

Having thus generally described the invention, it will be referred to in more detail by reference to the accompanying drawings in which.

Figure 1:
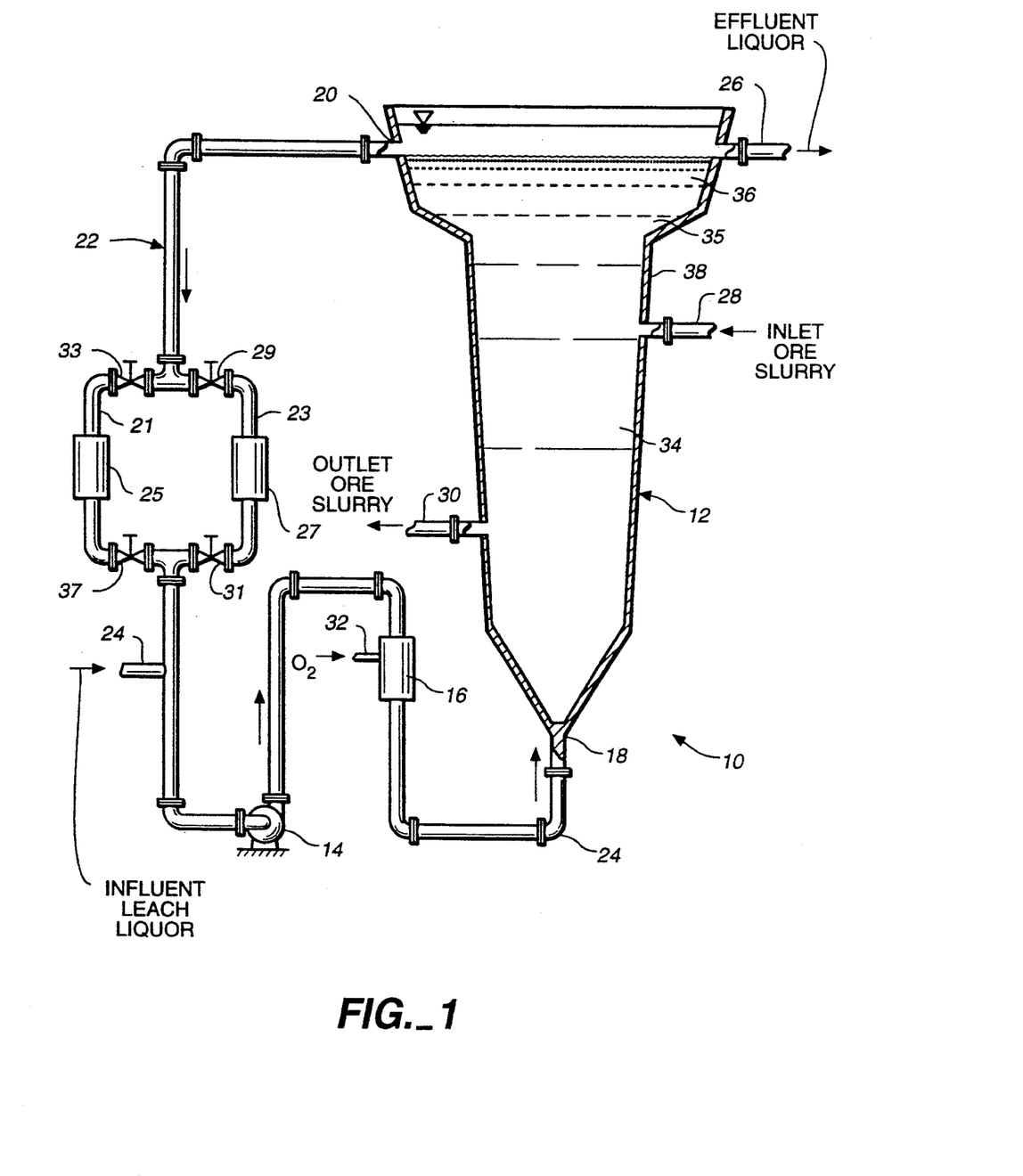
FIG. 1 illustrates a leaching assembly employing a two-zone tower in accordance with the invention.

With further reference to FIG. 1, a leaching assembly 10 comprises a two-zone tower 12, a pump 14 and an oxygen dissolving device 16.

Two-zone tower 12 has a fluid inlet 18 and a fluid outlet 20 connected by a recirculation line 22.

Recirculation line 22 includes an influent leach liquor line 24.

Tower 12 further includes an effluent leachate liquor line 26, an ore slurry inlet line 28 and a spent slurry outlet line 30.

Oxygen dissolving device 16 has an oxygen inlet line 32.

Tower 12 has a lower leaching zone 34 and an upper clarification zone 36, and an intermediate zone 35, defined by a tower wall 13. The tower wall 13 converges from top to bottom such that the crosssectional area of the interior of the tower is greater in the clarification zone 36 than in the leaching zone 34, and additionally the cross-sectional area increases with increased height of tower 12 in the leaching zone 34, in the direction of the clarification zone 36, and with increased height in the clarification zone 36.

Optionally, line 22 has a pair of branch lines 21 and 23 with metal recovery beds 25 and 27 respectively. Branch line 21 has valves 33 and 37 and branch line 23 have valves 29 and 31. The branch lines 21 and 23 with beds 25 and 27 may be located upstream or downstream of pump 14 but are preferably upstream of oxygen dissolving device 16.

In operation of the leaching assembly 10 of FIG. 1, a slurry of fine ore particles is introduced into tower 12 through ore slurry inlet line 28 and an aqueous leach liquor is introduced into recirculation line 22 through influent line 24. The influent leach liquor in recirculation line 22 is pumped by pump 14 along recirculation line 22 and through an oxygen dissolving device 16 and thence into the lower end of tower 12.

Oxygen is fed through oxygen inlet line 32 into oxygen dissolving device 16 which dissolves the oxygen in the aqueous leach liquor to form a leach liquor containing dissolved oxygen. The oxygen dissolving device 16 is operated so that the leach liquor is substantially saturated with oxygen to produce a high dissolved oxygen content, while avoiding or minimizing the presence of undissolved oxygen in the leach liquor.

The leach liquor containing dissolved oxygen is pumped into tower 12 by pump 14 at a rate such that the vertically upward flow rate of the liquid in tower 12 is high enough to maintain the fine ore particle solids in fluidized suspended state in the liquid. The liquid in tower 12 comprises the vehicle of the ore slurry and the leach liquor.

In this way a fluidized suspension of ore particles in the liquid is established in leaching zone 34.

The vertical upward velocity of the liquid decreases with height in the leaching zone 34 as a result of the increasing cross-sectional area of the interior of tower 12 with height, so that more settling rate of the solids occurs with decrease in the liquid velocity whereby the concentration of solids in the leaching zone 34 diminishes with height and is low in the intermediate region 35 adjacent clarification zone 36.

Furthermore, the upward velocity of the liquid in clarification zone 36 decreases with height as a result of the increasing cross-sectional area of this portion of tower 12 with height; the fluid outlet 20 and the effluent leachate liquor line 26 are located in upper regions of clarifying zone 36 in which residual suspended solids are at a minimum as a result of further settling of the less dense porous spent particles in clarification zone 36.

The tower wall 13 in intermediate zone 35 diverges rapidly upwardly in a relatively short height to effect an immediate, substantial reduction in upward velocity of the liquid and a consequent immediate substantial increase in settling of suspended solids, whereby a preliminary clarification is conducted in intermediate zone 35.

In particular the slurry of particles in the tower 12 is exposed to a vertically upward flow force and the vertically downward force consisting essentially of the force of gravity and is not subjected to any significant non-vertical forces or lateral forces. There will, however, be some nonvertical forces acting on the particles as a result of, for example, frictional forces between the flowing liquid and tower wall 13.

In this way there is established in the clarification zone 36, and especially in the upper region of zone 36, a leachate liquor of low suspended solids content. The leachate liquor comprises unused leach liquor, the vehicle of the ore slurry, leachate from the ore and unused dissolved oxygen.

A first portion of the leachate liquor in clarification zone 36 is withdrawn by pump 14 through fluid outlet 20 into recirculation line 22, while a second portion is withdrawn as effluent leachate through effluent leachate liquor line 26.

In the optional case in which recirculation line 22 contains branch lines 21 and 23, valves 29 and 31 are initially closed and valves 33 and 37 are open whereby the recycle stream of leachate liquor passes through recovery bed 25 and metal values in the leachate liquid are retained in bed 25. Thus the liquor re-entering tower 12 at fluid inlet 18 from line 22 is low in metal values so that a low concentration of leached metal values is established in tower 12 thereby favouring the leaching of metal values from the ore particles in tower 12. Periodically the liquor in branch line 21 upstream and downstream of bed 25 is tested for metal values; when the bed is saturated with metal values, such that the metal value content of the liquor upstream and downstream of bed 25 remains substantially unchanged, valves 33 and 37 are closed and valves 29 and 31 are opened so that the leachate liquor flows through branch line 23 and recovery bed 27.

Metal values are then retained in bed 27 while the metal values held in bed 25 are recovered to regenerate the retaining or absorption capacity of bed 25; this may be achieved by flowing an appropriate liquid through bed 25, by means of a separate circuit (not shown) such liquid having the capacity to remove the metal values held in bed 25. When bed 27 is saturated, regenerated bed 25 may then be used to absorb metal values from the leachate while bed 27 is regenerated.

When the metal values comprise gold the beds 25 and 27 suitably comprise activated carbon; and when the metal values comprise uranium the beds 25 and 27 suitably comprise an ion exchange resin.

In this variant it is not necessary to recover metal values form the effluent liquor flowing from line 26.

Figure 2:
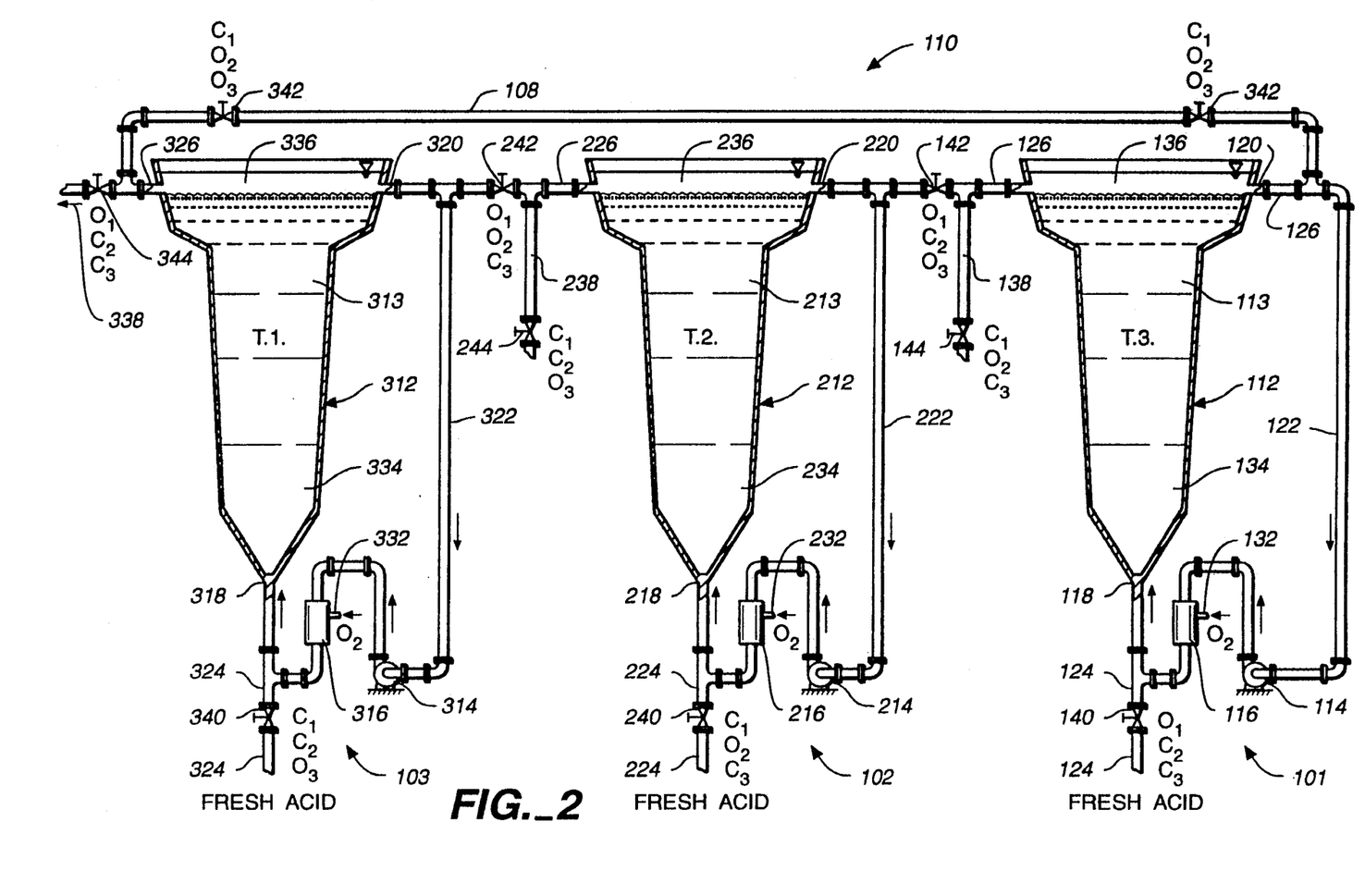
FIG. 2 illustrates a multi-tower assembly suitable for a batch process in which an ore slurry moves countercurrent to a solution of leaching chemical and dissolved oxygen.

With further reference to FIG. 2, there is shown a batch leaching assembly 110 having three leaching units 101, 102 and 103 and a recycle line 108.

Each of the leaching units 101, 102 and 103 comprises a leaching assembly similar to that of FIG. 1. For convenience the parts of these leaching units 101, 102 and 103 which correspond to the parts of the leaching assembly 10 of FIG. 1, are given identical numbers raised by 100 in the case of the unit 101, 200 in the case of the unit 102 and 300 in the case of the unit 103.

Thus the batch leaching assembly 110 of FIG. 2 more particularly includes three two-zone towers 112, 212 and 312 respectively, which towers are substantially identical and of the same form as tower 12 of FIG. 1 having a cross-sectional area greater at the top than the bottom defined by tower walls 113, 213 and 313, respectively. The towers 112, 212 and 312 are disposed in series with liquid lines leading to and between them as will be explained more fully in the following description.

The leaching unit 101 comprises two-zone tower 112, a pump 114 and an oxygen dissolving device 116. Tower 112 has a fluid inlet 118 and a fluid outlet 120 interconnected by a recirculation line 122.

Unit 101 further includes an influent leach liquor line 124, an effluent leachate liquor line 126, an oxygen line 132 communicating with oxygen dissolving device 116, and an effluent discharge line 138 in communication with effluent leachate liquor line 126.

Tower 112 further includes an ore slurry inlet line 128 and an ore slurry outlet line 130 and defines a leaching zone 134 and a clarification zone 136. A valve 140 is disposed in influent leach liquor line 124; a valve 142 is disposed in effluent leachate liquor line 126 and a valve 144 is disposed in effluent discharge line 138.

Valves 342 are disposed in recycle line 108.

The units 102 and 103 have parts which correspond to those of the unit 101 and are similarly numbered but increased by a factor of 100 and 200 relative to those of the unit 101. Thus unit 102 has valves 240, 242 and 244, corresponding to valves 140, 142 and 144 of unit 101, whereas unit 103 has valves 340 and 344 corresponding to valves 140 and 144. Unit 103 has valves 342 performing the function of valves 142 and 242 of units 101 and 102, however, valves 342 are in recycle line 108.

The operation of the batch process employed with assembly 110 of FIG. 2 is described as follows:

In starting up the towers 112, 212 and 312 are filled with a slurry of fine particle ore through their respective slurry inlet lines 128, 228 and 328, and are primed with an aqueous solution of leaching agent.

The process is conducted so that in a first stage a fluidized bed of suspended ore particles is established in tower 112 in leaching zone 134, acted on by fresh liquor leaching chemicals entering the bottom of tower 112 through inlet 118 from line 124. Liquid in tower 112 passes upwardly through leaching zone 134 and leaching of the fine particles of ore occurs in leaching zone 134. The liquid passing upwardly including the resulting leachate flows upwardly into intermediate zone 135 and clarification zone 136 and exits through outlet 120 in clarification zone 136 into recirculation line 122 and is pumped by pump 114 through oxygen dissolving device 116 and thence to inlet 118 and back into tower 112.

A portion of the rising liquid containing leachate exits from clarification zone 136 through effluent leachate liquor line 126 and is pumped by pump 214 into tower 212 via recirculation line 222, in which it receives fresh dissolved oxygen from oxygen dissolving device 216.

In like manner liquid flows upwardly through leaching zone 234 in tower 212 to establish a fluidized bed of ore, a portion is recycled from clarification zone 236 via recirculation line 222 and the balance flows through effluent leachate liquor line 226 into recirculation line 322 and is pumped by pump 314 into tower 312. Oxygen is dissolved in the liquid in recirculation line 322 by means of oxygen dissolving device 316.

At the end of this circuit the overflow of tower 312 is exhausted as a leachate pregnant in metal values through effluent discharge line 338 from where it is fed to a precipitation or electrowinning stage to recover the metal values from the leachate.

The flow rate of the liquid entering the tower 112 via fluid inlet 118 is such as to keep the ore particles suspended under fluidized conditions in leaching zone 134. This procedure is repeated in towers 212 and 312, to establish fluidized bed conditions, until the ore in each tower is spent.

Valves to be described hereinafter and which control the connections between the tower 112, 212 and 312, are manipulated, spent ore from the tower 112 is replenished with fresh ore and the procedure described with respect to tower 112 is carried out with tower 212 until the ore in tower 212 is spent, whereafter the procedure is carried out on tower 312 whereafter the cycle of treatment commences again with tower 112.

More specifically the batch leaching assembly 110 is operated as follows:

In a first stage valves 140 and 142 of unit 101; valve 242 of unit 102 and 344 of unit 102 are open; and valve 144 of unit 101; valves 240 and 244 of unit 102; and valves 340 and 342 of unit 103 are closed. Leaching solution is introduced into tower 112 through influent leach liquor line 124, liquid rising into clarification zone 136 exits through outlet 120 and is pumped by pump 114 along recirculation line 122 and into tower 112 via inlet 118. During the process of recirculation via line 122, oxygen is dissolved in the recirculation fluid by oxygen dissolving device 116.

A clarified overflow containing leachate as well as unused leaching agent and dissolved oxygen leaves tower 112 through effluent line 126 and passes through open valve 142 to the recirculation line 222 of tower 212. The overflow in recirculation line 222 passes through oxygen dissolving device 216 wherein oxygen is dissolved in the overflow, and the overflow enters tower 212 via inlet line 218. The overflow rises in tower 212 in contact with the ore therein in leaching zone 234 and leaching of the ore occurs with residual leaching agent present in the overflow from tower 112, in conjunction with the fresh dissolved oxygen introduced by device 216. A portion of the liquid rising in tower 212 into the clarification zone 236 exists via fluid outlet 220 and is recycled through recirculation line 222 to fluid inlet 218. A second portion of the liquid in clarification zone 236 exits tower 212 via effluent leachate liquor line 226 and flows through open valve 242 into the recirculation line 322 of unit 103 and is pumped by pump 314 via oxygen dissolving device 316 and via fluid inlet 318 into tower 312. The liquid in tower 312 which comprises leachate from towers 112 and 212 together with residual leaching chemicals from tower 112 and fresh dissolved oxygen from oxygen dissolving device 316 effects leaching of the ore particles in leaching zone 334 of tower 312 and the resulting liquid in clarification zone 336 is partly recycled to inlet 318 via recirculation line 322 and partly is discharged through effluent discharge line 338. This continues until the ore in tower 112 is spent.

Thus in this first stage leaching is carried out primarily in tower 112 which is the only tower into which fresh leaching agent is fed, however, secondary leaching occurs successively in towers 212 and 312 as a result of unused leaching agent in the overflow from tower 112 and the fresh dissolved oxygen introduced by devices 216 and 316.

In a second stage, the spent ore in tower 112 is replaced with fresh ore. Valves 140 and 142; 244; and 340 and 344 are closed; and valves 144; 240 and 242; and 342 are open.

Fresh leach agent is added through influent leach liquor line 224 and inlet 218 to the bottom of tower 212. Liquid rises in tower 212 as described previously for tower 112, leaching occurs in the resulting fluidized bed and a rising clarified liquid collects in clarification zone 236, which liquid comprises leachate, unused leaching agent and possibly unused dissolved oxygen. A portion of this liquid in clarification zone 236 passes through outlet 220 into recirculation line 222 and is pumped by pump 214 through oxygen dissolving device 216 and back into tower 212 via inlet 218. An overflow portion of the liquid in clarification zone 236 exits through effluent leachate liquor line 226 and enters recirculation line 322 of unit 103. The liquid rises through the fluidized bed in leaching zone 334 of tower 312 to form a liquid containing leachate in clarification zone 336, and overflow from zone 336 exits tower 312 via effluent leachate liquor line 326 and passes along recycle line 108 into recirculation line 122 of unit 101 and thence into tower 112 from which overflow in clarification zone 136 exits via effluent discharge line 138.

Thus in this second stage primary leaching occurs in tower 212 of unit 102 which is the only tower into which fresh leaching agent is added, however, secondary leaching occurs in towers 312 and 112 successively with leaching chemicals present in the discharge from tower 212. The second stage continues until the ore in tower 212 is spent.

In a third stage of the process, valves 140 and 144; 240 and 242; and 344 are closed and valves 142; 244; and 340 and 342 are open. Spent ore in tower 312 is replaced with fresh ore.

Fresh leaching chemical is added through influent leach liquid line 324 and inlet 318 into tower 312 in which a fluidized bed of the ore is established. Liquid rising into clarification zone 336 exits via outlet 320 into recirculation line 322 and is pumped by pump 314 through oxygen dissolving device 316 and back into tower 312 via inlet 318. An overflow of clarified liquid in clarification zone 336 exits via effluent leachate line 326 and flows into recycle line 108 to the recirculation line 122 of unit 101 from which it is pumped by pump 114 through oxygen dissolving device 116 into tower 112 via inlet 118. Liquid rises in tower 112 and the overflow from clarification zone 136 exits via effluent leachate line 126 and thence into recirculation line 222 of unit 102 where it is pumped by pump 214 through oxygen dissolving device 216 into tower 212 via inlet 218. Liquid rises in tower 212 and the overflow in clarification zone 236 exits via effluent leachate liquor line 226 and is discharged via effluent discharge line 238. Thus in the third stage of the process leaching is carried out primarily in tower 312 which is the only tower into which fresh leaching agent is fed, however, secondary leaching occurs successively in towers 112 and 212 as a result of unused leaching agent in the overflow from tower 312 and the fresh dissolved oxygen introduced by devices 116 and 216.

It will be understood that in all three stages recirculation of liquid occurs from the clarification zones 136, 236 and 336, via recirculation lines 112, 222 and 322, and thus recycling within the units 101, 102 and 103 occurs in the primary and secondary leaching operations in the first, second and third stages to enhance the efficiency.

Figure 3:
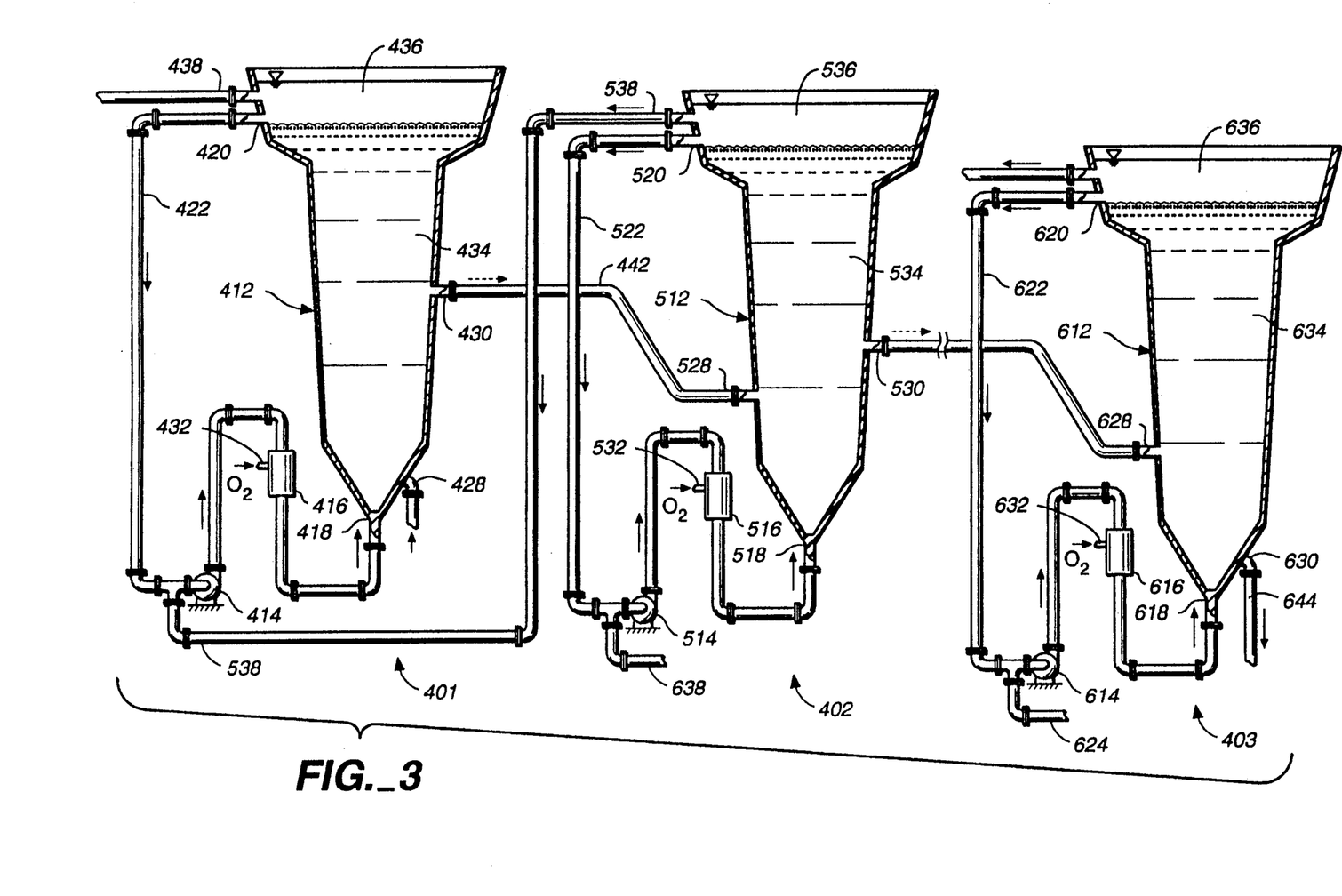
FIG. 3 illustrates a multi-tower assembly suitable for a continuous process in which several towers are interconnected and provision is made for leaching chemical and oxygen to be circulated through the towers.

With further reference to FIG. 3, a leaching installation for continuous leaching comprises a leaching assembly 410 having leaching units 401, 402 and 403.

The leaching units 401, 402 and 403 are similar in many respect to the leaching units 101, 102 and 103 of FIG. 2 and the leaching assembly 10 of FIG. 1. Parts of the leaching assembly 410 which are the same as or function in a manner similar to those of leaching assembly 110 of FIG. 2 are identified by similar integers raised to the 400, 500 and 600 series for units 401, 402 and 403 respectively.

Thus, leaching unit 401 comprises a two-zone tower 412, a pump 414 and a oxygen dissolving device 416.

Two-zone tower 412 has a fluid inlet 418 and a fluid outlet 420 connected by a recirculation line 422.

Tower 412 further includes an effluent leachate discharge line 438, an ore slurry inlet line 428 and a slurry outlet line 430.

Oxygen dissolving device 416 has an oxygen inlet line 432.

Tower 412 has a leaching zone 434 and intermediate zone 435 and a clarification zone 436. The tower 412 is of the same form as the tower 12 of FIG. 1 and the towers 112, 212 and 312 of FIG. 2. Thus the tower 412 converges from top to bottom such that the cross-sectional area of the interior of the tower is greater in the clarification zone 436 than in the leaching zone 434 and additionally the cross-sectional area increases with increased height of tower 412 in the zones 434, 435 and 436.

Unit 402 is similar to unit 401 with effluent discharge line 538 communicating with recirculation line 422 upstream of pump 414.

A gravitational flow line 442 interconnects slurry outlet 430 of tower 412 and slurry inlet 528 of tower 512.

Unit 403 is similar to units 401 and 402. Effluent liquid discharge line 638 of unit 403 communicates with recirculation line 522 of unit 402 upstream of pump 514, and a gravitational flow line (not shown) interconnects slurry outlet 530 of tower 512 and slurry inlet 628 of tower 612.

Slurry outlet 630 of unit 403 communicates with a waste line 644.

An influent leach liquor line 624 communicates with recirculation line 622 upstream of pump 614.

The leaching unit 401, 402 and 403 are shown in sequence for carrying out a continuous process for recovering a metal value from a mineral ore.

Units 401 and 403 represent initial and final units respectively with unit 402 being an intermediate unit. There may be one intermediate unit 402 or several such intermediate units, or intermediate unit 402 may be dispensed with so that there are only units 401 and 403.

The general operation of leaching assembly 410 is similar to the operation described with respect to FIGS. 1 and 2 except that liquor moves continuously through the assembly 410 from a source connected to influent leach liquor line 624, sequentially through towers 612, 512 and 412, with final leachate being discharged through effluent leachate discharge line 438. Fine particle mineral ore, on the other hand, moves generally in counterflow to the liquor from a source into slurry inlet 428 and sequentially through towers 412, 512 and 612, with the spent ore slurry being discharged through waste line 644.

More especially an established continuous leaching operation in leaching assembly 410 functions as follows.

Fresh slurry of particulate mineral ore containing a metal value to be leached enters tower 412 through slurry inlet 428. Liquid comprising leaching agent, dissolved oxygen and a leachate from towers 512 and 612 is introduced into tower 412 through inlet 418.

The flow of the liquid through inlet 418 and the slurry through slurry inlet 428 is controlled to establish a fluidized suspension of the mineral ore particles in leaching zone 434.

Leaching of the mineral ore occurs in leaching zone 434 and a clarified liquid or pool comprising leachates, unused leaching agents and dissolved oxygen collects in clarification zone 436.

A portion of the liquid in clarification zone 436 exits through outlet 420 into recirculation line 422 and is pumped by pump 414 through oxygen dissolving device 416 and back into tower 412. The leaching agent present in the liquid recycled from outlet 420 of tower 412 is supplemented by leachate from effluent discharge line 538 of tower 512.

An overflow portion of the liquid in clarification zone 436 is discharged as leachate through effluent discharge line 438 and passes to an appropriate treatment stage for recovery of metal values from the leachate.

Slurry outlet 430 is at an approximate midpoint of leaching zone 434 and delivers partly leached ore slurry from tower 412 through gravitational flow line 442 to slurry inlet 528 of tower 512.

The leaching operation in tower 512 is substantially the same as that in tower 412 with recycling of clarified liquid containing leachate and unused leaching agent through outlet 520 and recirculation line 522, the recycling liquid being supplemented by leachate in effluent discharge line 638 from tower 612. The overflow liquid from clarification zone 536 is discharged through effluent leachate discharge line 538, the leachate being, as described above, discharged into recirculation line 422 upstream of pump 414.

The partly leached high solids slurry flows along line 442 by gravity from tower 412 to tower 512 and similarly flows by gravity through a similar line (not shown) from tower 512 to tower 612 through slurry outlet 530 of tower 512 and slurry inlet 628 of tower 612, respectively. The liquid rising in tower 612 into clarification zone 636 is recycled through recirculation line 622 and supplemented with fresh leaching agent via influent leach liquor line 624. The overflow liquid of clarification zone 636 flows through effluent discharge line 638 into recirculation line 522 of tower 512.

In this way the leaching agent flows sequentially through towers 612, 512 and 412 and the ore slurry flows in countercurrent direction sequentially through towers 412, 512 and 612.

Figure 4:
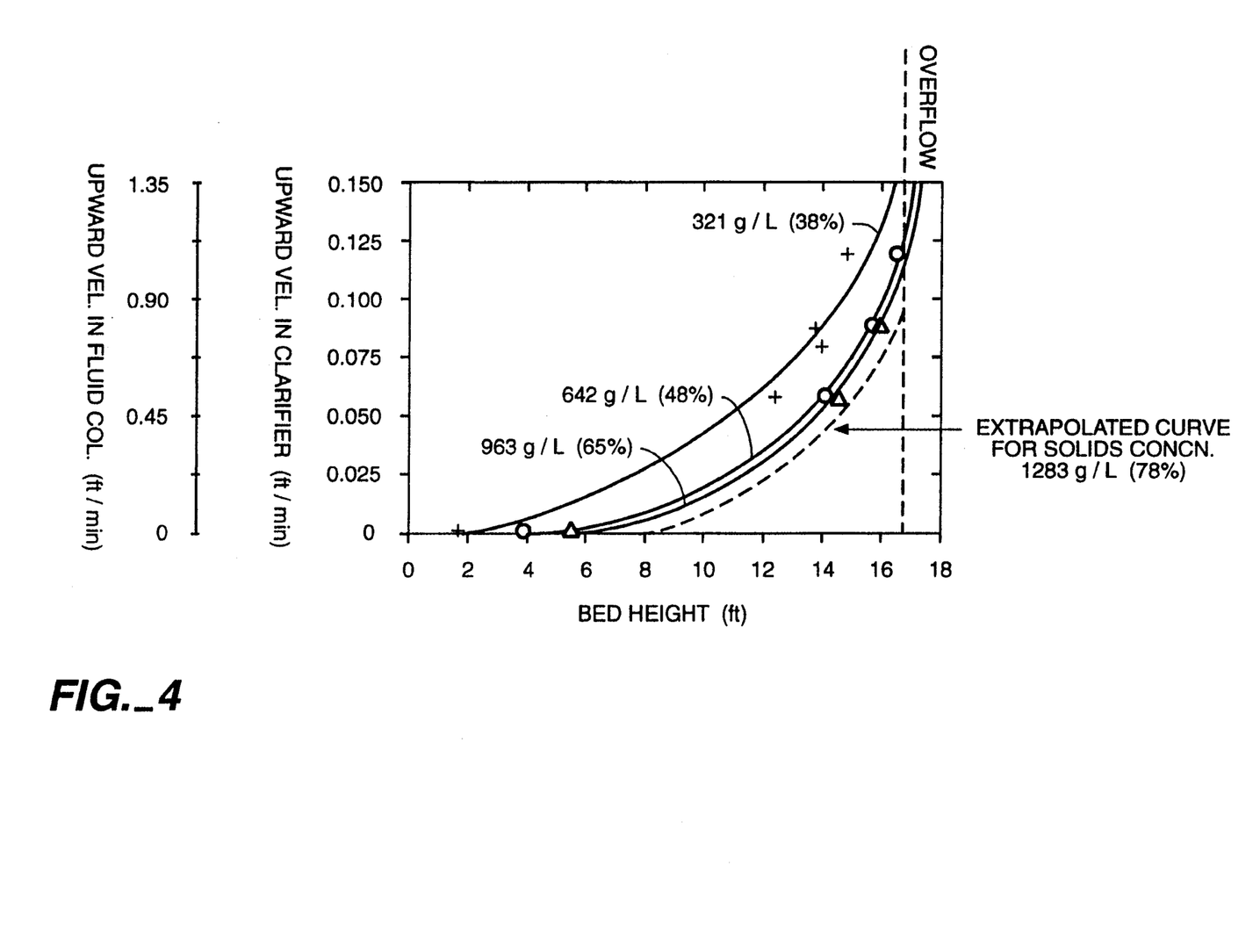
FIG. 4 illustrates graphically the relationship between the bed height and fluid velocity in the leaching and clarification zones for different suspended solids concentrations.

With further reference to FIG. 4 there is shown graphically the relationship between the height of the fluidized bed in the tower and the fluid velocity in the leaching and clarification zones for different concentrations of suspended solids. By reference to FIG. 4 it is possible to determine for a particular slurry concentration the velocity profile required in the leaching zone and the clarification zone and these parameters can be obtained by appropriate design of the tower, and in particular change in cross-sectional area of the tower with increase in height, in conjunction with the inlet flow rate of leaching liquor.

Figure 5:
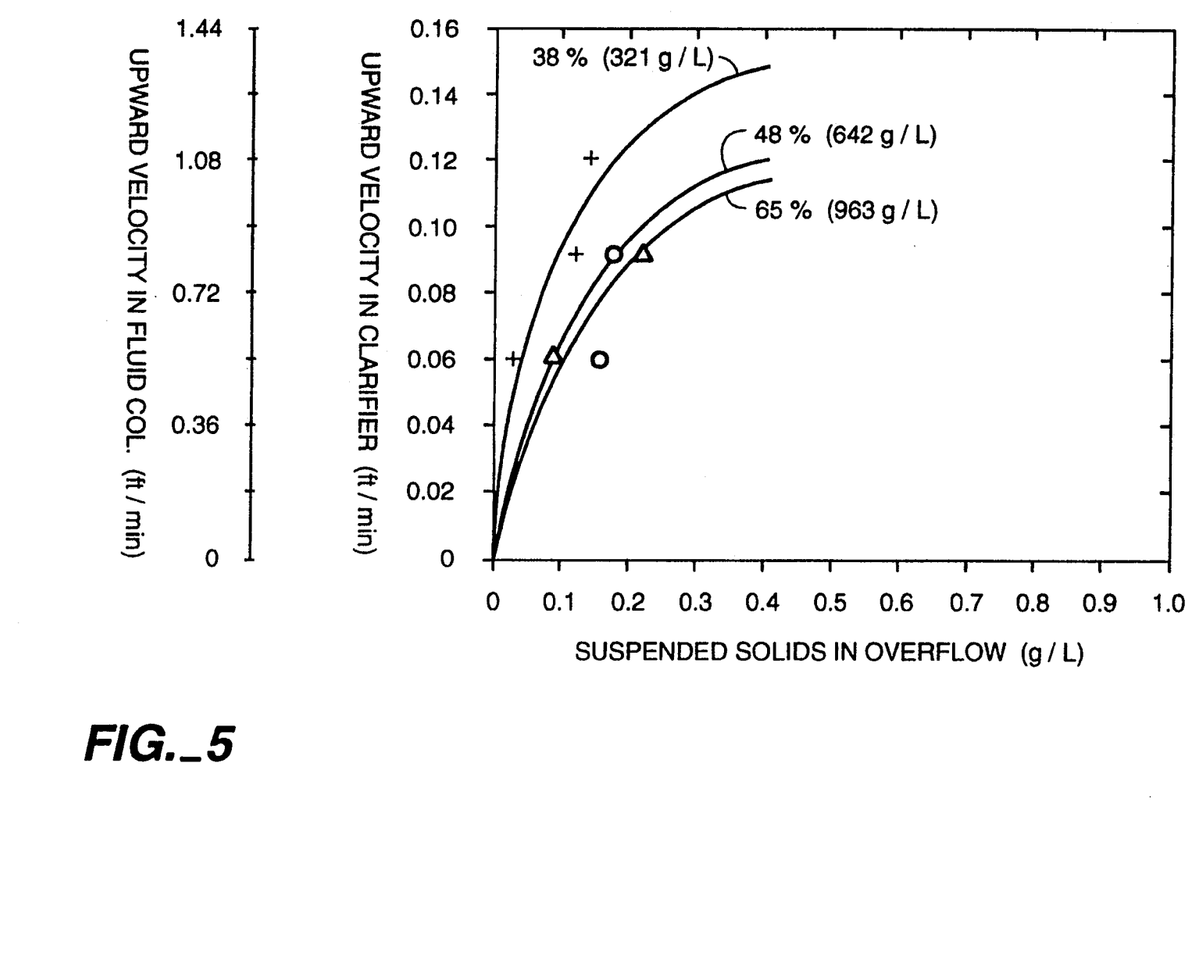
FIG. 5 illustrates graphically the relationship between the fluid velocities in the leaching and clarification zones and the concentration of suspended solids in the overflow from the clarification zone for different suspended solids concentrations.

Similarly by reference to FIG. 5 the suspended solids in the overflow is identified for different velocity profiles in the leaching zone and clarifications zone, for different ore concentrations and based on such a plot appropriate velocity parameters for a particular ore concentration can be determined to achieve clarified liquid of satisfactory low solids content.

Thus, based on the information in FIGS. 4 and 5 appropriate design of the towers and the flow parameters can be developed to produce a clarified leachate of a desired low suspended solids content.

The embodiments of the invention in which an exclusive property or privilege is claimed are defined as follows:

1. A process for recovering a metal from a material containing the metal, said metal being selected from the group consisting of gold, uranium, copper, zinc, nickel and lead, and said material being selected from the group consisting of ores, concentrates and calcines, which process comprises:

a) introducing an aqueous slurry of particles of said material containing the metal into a leaching zone of a vertical column, the vertical column having a lower leaching zone and an upper clarifying zone, sa id slurry containing an aqueous solution of leaching agent, which is initially saturated with dissolved oxygen, and defining a fluid medium, and said particles of said material containing the metal;

b) maintaining a velocity profile in said column spanning said leaching and clarifying zones effective to maintain said particles fluidly suspended in said leaching zone and to promote settling of said porous particles from an upper region of the leaching zone such that said clarifying region comprises an aqueous leachate having not more than 200 mg/l of said particles; and c) withdrawing a metal-containing leachate from the clarifying zone.

2. The process of claim 1, wherein said velocity profile is such that the clarifying zone comprises an aqueous leachate having not more than 100 mg/l of said particles.

3. The process of claim 1, wherein said slurry is substantially free of undissolved gases.

4. The process of claim 1, wherein said slurry is exposed to forces consisting essentially of a vertically upward flow force and a vertically downward force of gravity.

5. The process of claim 1, comprising establishing a recycle stream of at least a portion of said aqueous leachate, said recycle stream exiting said column at said upper clarifying zone and re-entering said column at said lower leaching zone.

6. The process claim 5, comprising flowing said recycle stream through a metal recovery bed upstream of the re-entry of said column to remove metal from the recycle stream prior to re-entry into said column.

7. A process for recovering a metal from a selected containing the metal, the metal being selected form the group consisting of gold, uranium, copper, zinc, nickel and lead; and wherein said material is selected form the group consisting of ores, concentrates and calcines, which process comprises continuously passing an aqueous solution of leaching agent, which is initially saturated with dissolved oxygen, countercurrent through a fluidized column of an aqueous slurry containing the material and recovering at least a portion of leachate containing the metal, while introducing said aqueous solution of leaching agent into the column at a velocity effective to maintain a bed of said column in a fluidized state.

8. The process of claim 7, in which the column increases in cross-section from a lower solution-introduction zone to an upper leachate recovery zone.

9. The process of claim 7, which is a batch process.

10. The process of claim 7, which further comprises drawing off leachate from an upper portion of the column and adding the same to additional aqueous solution containing leaching agent, which is initially saturated with dissolved oxygen, and introducing the aqueous solution containing leachate as a recycle stream into a lower part of the column.

11. The process as defined in claim 7, which comprises, in a plurality of fluidized columns in series, including an initial column and a final column and one or more intermediate fluidized columns:

a) adding fresh material to the initial column, and passing the same as partly leached material to said one or more intermediate columns and then to said final column, where leached material is recovered;

b) adding fresh aqueous solution of leaching agent to a lower part of the final column in a solution which is initially saturated with dissolved oxygen;

c) passing leachate containing leaching agent from a top zone in the final column into a lower part of an intermediate zone;

d) passing leachate containing leaching agent from a top zone in the intermediate column into a lower part of the initial column, and combining the same with aqueous solution which is initially saturated with oxygen; and e) recovering leachate from an upper zone of an initial column.

12. The process of claim 1, wherein a portion of the leachate and the top zone of each of said initial, intermediate and final columns is returned to the lower part of the same column as part of the solution containing dissolved oxygen.

13. The process of claim 11, which comprises:

a) combining the portion of the leachate from the top zone of said final column with said fresh leaching chemical to form a combined final stream, dissolving oxygen in said combined final stream and passing said combined final stream containing dissolved oxygen into said lower part of said final column, b) combining the portion of leachate from the top zone of said intermediate column with said leachate passed from said top zone of said final column to form a combined intermediate stream, dissolving oxygen in the combined intermediate stream and passing the combined intermediate stream containing dissolved oxygen into the lower part of the intermediate column, and c) combining the portion of leachate from the top zone of said initial column with said leachate passed from said top zone of said intermediate column to form a combined initial stream, dissolving oxygen in the combined initial stream and passing the combined initial stream containing dissolved oxygen into the lower part of the initial column.

14. A process for recovering a metal from a material containing the metal, said metal being selected from the group consisting of gold, uranium, copper, zinc, nickel and lead; and said material being selected form the group consisting of ores, concentrates and calcines, the process comprising:

a) providing, in a vertically elongated vessel having a wall tapering outward from a floor to an open mouth at the top, a fluid column made up of an aqueous dispersion of the material;

b) continuously feeding into the column an aqueous slurry of the material as in inflow;

c) forming a recycle stream by drawing from an upper part of the column an overflow, adding leaching chemical to the recycle stream, dissolving oxygen in the recycle stream and recycling it to a lower part of the column;

d) maintaining the column at a leaching extraction temperature and the concentration of leaching chemical at a leaching extraction level;

e) controlling the flow of the recycle stream into the fluid column, at a velocity to maintain the bed fluidized and to maintain at upward flow of liquid in contact with the solids of the slurry, whereby a substantially clear liquor is separated from the solids to provide the overflow;

f) withdrawing, from an intermediate height in the column, a slurry of the material which has been treated into the column as an outflow;

g) coordinating the inflow and outflow of slurry with the inflow of the recycle stream to maintain the column at a depth in the vessel; and h) causing an overflow of low suspended leached solids liquid from the top of the column containing leaching chemicals.

15. The process of claim 14, wherein a plurality of said vertically elongated vessels are employed in series, each being provided with a fluid column, the vessels comprising a first vessel, at least one intermediate vessel, and a terminal vessel, the process comprising:

a) feeding raw material to the first column, b) withdrawing leached slurry from the terminal column, c) passing partially leached slurry from the first column serially to the subsequent columns, d) providing fresh leaching chemical to the recycle stream of the terminal column, e) providing the recycle stream of the intermediate sand first columns with a supply of leaching chemical in low solids liquid overflowing from the succeeding column, and f) discharging the leaching chemical in the low solids overflow from the first column.

16. The process of claim 14, wherein the material is ore containing uranium.

17. The process of claim 16, wherein the leaching chemical comprises sulphuric acid.

18. A process for leaching a metal from a material containing the metal, the metal being selected from the group consisting of gold, uranium, copper, zinc, nickel and lead, and said material being selected from the group consisting of ores, concentrates and calcines; which comprise passing a leaching agent being saturated with dissolved oxygen upwardly through a bed of the material at a velocity sufficient to maintain a fluidized bed and recovering leachate containing the metal from said bed.

19. A process for countercurrent contacting of fluids and solids wherein interaction occurs while the solids are dispersed at least in part in the fluid, comprising:

a) passing a flow of a solution containing leaching agent and being saturated with dissolved oxygen outwardly through a bed of a material selected from the group consisting of ores, concentrates and calcines, which contains a leachable water-soluble metal selected from the group consisting of gold, uranium, copper, zinc, nickel and lead, in volume and a velocity effective to provide a fluid bed surmounted by a supernatant body of a relatively clarified solution containing said water soluble component;

b) recycling a part of the relatively clarified solution by drawing it from said supernatant body, dissolving oxygen in it and passing it into the bottom of said bed;

c) separating steps a) and b) until the material bed is substantially spent; and d) recovering metal from the solution.

* * * * *